Aug. 3, 1943.  J. E. HAYES  2,325,854
LOW REACTANCE SWITCHING DEVICE
Filed Jan. 31, 1942  2 Sheets-Sheet 1
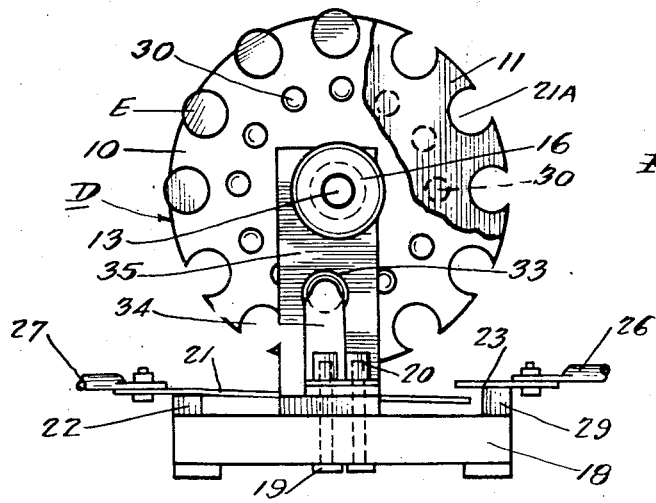
FIG. 1
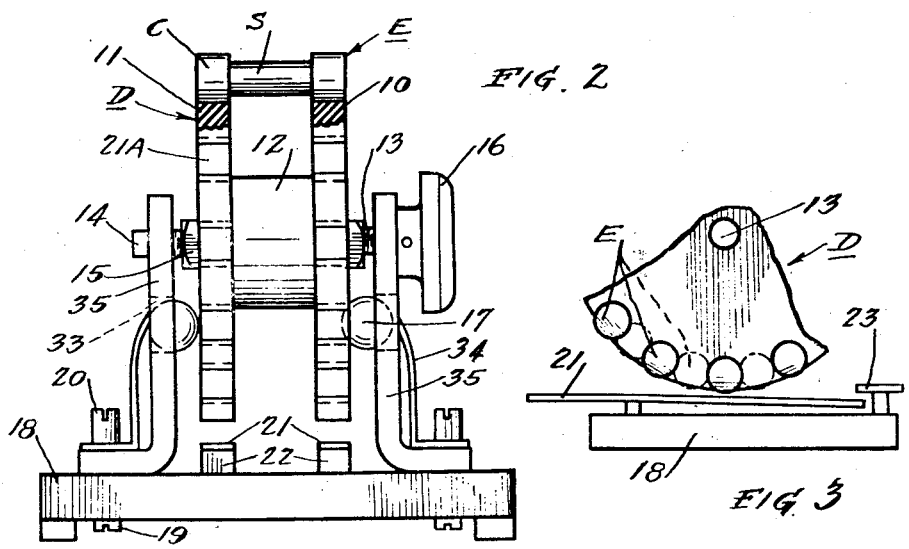
FIG. 2
FIG. 3
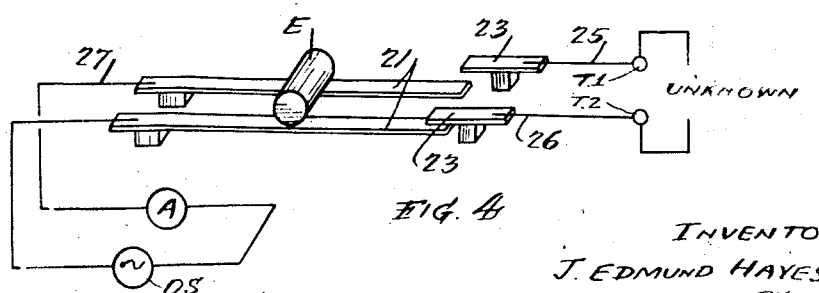
FIG. 4
INVENTOR
J. EDMUND HAYES
BY
Louis H. Caneau
ATTORNEY.

Aug. 3, 1943.  J. E. HAYES  2,325,854
LOW REACTANCE SWITCHING DEVICE
Filed Jan. 31, 1942  2 Sheets-Sheet 2
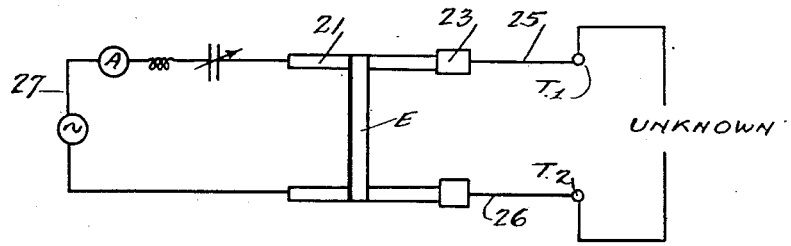
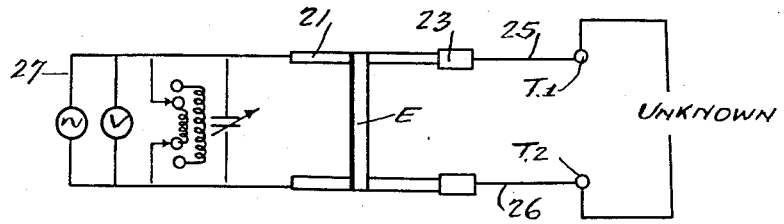
INVENTOR—
J. EDMUND HAYES
BY
*Louis H. Caneau*
INVENTOR.

Patented Aug. 3, 1943

2,325,854

UNITED STATES PATENT OFFICE 2,325,854

LOW REACTANCE SWITCHING DEVICE

John Edmund Hayes, Montreal, Quebec, Canada

Application January 31, 1942, Serial No. 428,992

9 Claims. (Cl. 175—183)

This invention relates to a switching device.

More particularly, the device of the present invention is a low reactance switch for use at high frequencies, and it finds its most valuable application in the radio art when the impedance of an external circuit is to be determined.

In determining or testing the impedance of such an external circuit, one of the methods heretofore employed was to resort to what is known as the "substitution" method, which entails the use of a well-known decade resistance box and therefore, brings into play undesired reactances particularly at higher frequencies, mitigating appreciably against the accuracy of a test. To the best of my knowledge, this method is considered as being unsatisfactory at very high frequencies.

The switch of the present invention renders unnecessary the use of the usual decade box and departs to such an extent from the prior practice that the reactances introduced are for present practical purposes negligible.

The switch of the present invention is also very useful in determining the impedance characteristics of an external or "unknown" circuit for different selected oscillations or frequencies.

The objects of the invention, generally, are to provide a novel and useful switching device to be used in determining the impedance of an external circuit for any given high frequency.

A specific object of the invention is to provide a switching device to be used in the radio art, to determine the impedance of an external circuit in a more accurate manner than it has been possible heretofore, and in a manner which I have proved by actual practice to be entirely satisfactory and acceptable.

A particular object of the invention is to so construct the switch that spaced, calibrated elements, which, for instance, may be resistors, capacitors, or inductors, are successively brought into, and complete, a circuit of known frequency while at the same time disconnecting the external circuit whose impedance it is desired to determine for a known frequency. More particularly, the device so operates that for a given or selected frequency, an easy and convenient comparison may be made between the reading on a measuring instrument of the impedance of the external circuit with the reading obtained from a standard or known circuit.

In the drawings wherein like numerals of reference indicate corresponding parts in the various figures, Figure 1 is a side view of a switching device made in accordance with the invention, parts being broken away;

Figure 2 is an end view of the device, parts being broken away;

Figure 3 is a fragmentary, more or less diagrammatic, view of Figure 1;

Figure 4 is a diagrammatic view of the device and electric circuit used when determining the impedance of the external as impedance only, that is, without resolving it into its resistive and reactive components.

Figures 5 and 6 are diagrammatic views of the switch, connected to modified circuits.

Referring now by numerals to the drawings, particularly to Figures 1 to 3, which show the preferred structure of the switch, D is a drum of insulating material comprising two spaced discs 10 and 11 and an intervening portion or spacer 12 of reduced diameter. The peripheral edges of the discs 10 and 11 are formed with aligned circular notches or recesses 21A into which are slidably received elements E, such as resistors, capacitors or inductors, so that the elements preferably may be removably held on the drum. The drum is rigidly mounted on a shaft, which as shown, may comprise two aligned shaft sections 14 and 13 threaded into opposite faces of the drum. Preferably, lock nuts 15 are threaded on the shaft sections, respectively, to engage the adjacent faces, respectively, of the drum D.

The shaft is journalled in brackets 35 secured to a base 18 of insulating material, as by bolts 20. The drum may be rotated as by a suitable knob 16 rigidly secured to the shaft section 13.

The element used may carry on the opposite ends of its shank S, members or contacts C adapted to fit into the notches. Conveniently, and as shown, the notches are formed to allow part of the contacts to project outside the periphery of the drum discs.

The elements E, more particularly the end contacts C, are successively brought into contact or electrical engagement with spaced, parallel, resilient metallic switch arms 21 suitably anchored to the base 18 as at 22, the arms being depressed or flexed toward the base when an element is in engagement with the arms. If preferred, (though not shown) points may be secured to the arms to be engaged by the elements, successively. When the arms are free of any of the elements E, the arms return to their normal, unflexed position, the free ends of the arms engaging with points or contacts 23 anchored to the base as at 29.

To releasably lock the drum with any one of the elements E in engagement with the arms 21, and with such element clear of such arms, alternately, a detent device is used. Thus, the opposite or remote faces of the discs 10 and 11 are provided with a plurality of evenly-spaced and circularly-disposed recesses or cavities 30, preferably spherical in shape, there being as many cavities in each disc as there are element-receiving notches 21A. Co-operating with the cavities in each disc is a ball 17 held in a circular aperture 33 through the adjacent bracket, and pressed against the disc by means of a spring 34 anchored at one end to the bracket and formed at the other or free end to engage and exert a pressure against the ball. As the ball lodges in a cavity, the drum is held against rotation until the force applied to the drum to rotate the same is such as to urge the ball out of the cavity against the pressure of the spring. In order that the drum may be releasably locked in position to have an element E in contact, or out of contact, with the switch arms 21 as aforesaid, the holes 33 are in staggered relationship.

In the circuit shown in Figure 4, the arms 21 are connected in series by a suitable conductor 27, in the length of which are a suitable oscillator OS and a suitable ammeter A. When the drum is in such a position that one of the elements E (which are resistors) is in contact with the arms 21 as in Figures 1, 3 and 4 (or in contact with points, if any are used), there obtains a circuit as follows: Oscillator, conductor 27, one of the arms 21, the resistor E, the other arm 21, the conductor 27, the measuring instrument A, the conductor 27, and the oscillator. One of the points 23 is connected to one terminal, T1, of the external circuit, by means of a conductor 25, while the other point 23 is connected to the other terminal T2 as by a conductor 26. When the arms 21 are clear of any resistor E, they engage with the points 23 and the circuit is now the following: terminal T2, conductor 26, one of the points 23, one of the arms 21, the conductor 27, the oscillator, the conductor 27, the measuring instrument, the conductor 27, the other arm 21, the other point 23, the conductor 25, the terminal T1 and terminal T2.

The operation of the switch when associated with the circuit shown in Figure 4 is as follows:

The resistors E used are of graduated, known values, and are disposed consecutively on the drum in the order of their values, their ends or contact members C projecting beyond the periphery of the drum D. The points 23 are connected to the terminals T1 and T2.

The drum is next rotated intermittently to bring the elements or resistors, one by one, into engagement with the arms 21 (or the points on the arms, if any are used), while the instrument, or more particularly the needle or pointer, is kept under observation. The position of the needle will be constant when the circuit through the element is broken, that is, while the arms 21 engage the points 23; while the position of the needle, when the circuit includes one of the resistors E, will vary according to the value of the resistance of the particular element then short-circuiting the arms. When the needle occupies a constant, or substantially constant position, on the dial of the instrument, the resistance or value of the element E now in engagement with the arms 21 is noted. The value of the impedance of element will be a measure of the impedance of the circuit under test. In the event that the impedance of the external circuit should be intermediate between the values of two successive elements E, the exact value of the impedance is determined by noting the relative positions of the meter needle and from this making the necessary interpolation.

When it is desired to determine the resistive and reactive components of the impedance of the external circuit, a calibrated variable condenser is inserted in series with the circuit, as shown in Figure 5. It is preferable to insert a suitable coil in series with the condenser in order to allow the circuit to be tuned to resonance for all types of external or unknown circuits. As will be clearly understood, the reactance component and the resistance component are obtained by the settings of the condenser and the switch, respectively.

This circuit is especially useful and satisfactory in measuring low values of resistances, in the range of from 0 to about 500 ohms and the reactances associated with such resistances. If desired, the variable condenser and coil may be inserted in series with the conductor 25.

Where the switch is to be used in measuring external circuits having resistive components of say up to a few thousand ohms, a calibrated condenser and resonance coils may be arranged in parallel across the conductors 27, a voltmeter of the vacuum tube type being used as measuring instrument or indicator, all as shown in Figure 6. The resonance coils are not calibrated but they are found to be necessary to allow the measuring circuit to be tuned to resonance in the range of from 5000 to 20,000 kilocycles. If desired, the variable condenser and the resonance coils may be connected in parallel across the conductor 25—26.

In the circuits shown, the elements E are resistors and generally, the use of resistors is satisfactory. However, in certain circuits, it might be desirable to employ capacitors, or inductors, in lieu of resistors. As will clearly be seen, the switch of the present invention is such that the elements used may be either resistors, capacitors or inductors.

The arms 21 and points 23, and the conductors 25—26—27 are made as short as may be convenient so as to minimize the reactance to which such elements may give rise during the operation of the device.

The switch of the present invention is also useful in determining the impedance of an "unknown" or external circuit for different frequencies.

I claim:

1. In a device for determining the impedance of an external circuit, in combination, a conductor including two spaced metallic members and contacts for said members in the circuit; a plurality of spaced calibrated elements, and means for selectively bringing said elements into engagement with said members to break the circuit between said members and said contacts while completing the circuit by short-circuiting through the elements.

2. In a device for determining the impedance of an external circuit, in combination, a conductor including two spaced metallic members and contacts for said members in the circuit; a measuring instrument and an oscillator in series with said conductor; a plurality of spaced calibrated elements, and means for selectively bringing said elements into engagement with said members to break the circuit between said members and said contacts while completing a circuit in which said oscillator, measuring instrument and element are in series.

3. In a switch, a pair of spaced switch members and contacts therefor in the circuit to be controlled by the switch, said members being normally in engagement with said contacts, a drum mounted to rotate adjacent said members, and a plurality of calibrated elements mounted on the periphery of said drum and circumferentially spaced therearound to engage said members one at a time to move said members away from said contacts, the element being adapted to form a conductor between said members to complete the circuit by short-circuiting through said element.

4. In a switch, a pair of resilient switch arms, contacts normally engaged by said arms, a drum journalled to rotate adjacent said arms, calibrated elements mounted on the periphery of said drum and circumferentially spaced to engage one at a time said arms to move the same away from said contacts, the element being adapted to form a conductor between said arms when in engagement therewith, and a detent device for releasably locking said drum against rotation when any of said elements is engaged with said arms or disengaged therefrom, respectively.

5. In a switch, a pair of spaced arms, contacts for said arms normally in engagement therewith, a drum mounted to rotate adjacent said arms, calibrated elements mounted on the periphery of said drum to project beyond the periphery thereof and circumferentially spaced around the periphery of said drum to engage one at a time said arms to move the same away from said contacts, the element being adapted to form a conductor between said arms when in engagement therewith, and a detent device for releasably locking said drum against rotation when any of said elements is engaged with or disengaged from said arms, respectively.

6. In a device for determining the impedance of an external circuit, in combination, a conductor including two spaced metallic members and contacts for said members in the circuit, a plurality of spaced calibrated elements, and means for selectively bringing said elements into engagement with said members to move at least one of said members away from its associated contact to break the circuit between said last-named member and contact while completing the circuit by short circuiting through the element.

7. In a device for determining the impedance of an external circuit, in combination, a conductor between the terminals of the external circuit including relatively movable, normally co-engaging metallic members forming switch means, a plurality of spaced, calibrated elements, and means for selectively bringing said elements into engagement with one of said members to break the circuit between said members while completing the circuit by short circuiting through the element.

8. In a switch, a pair of spaced switch members and contacts therefor in the circuit to be controlled by the switch, said members being normally in engagement with said contacts, a plurality of spaced calibrated elements, and means for selectively bringing said elements into engagement with said members to move at least one of said members away from its associated contact to break the circuit between said last-named switch member and contact, the element being adapted to form a conductor between said switch members to complete the circuit by short circuiting through said element.

9. In a switch, a conductor in the circuit to be controlled by the switch including normally co-engaging switch and contact means, a plurality of elements, and means mounting said elements as a unit operable to selectively bring said elements into engagement with said switch means to break the circuit between said switch means and said contact means while completing the circuit by short circuiting through the element.

J. EDMUND HAYES.